United States Patent [19]
Zelley

[11] Patent Number: 5,202,963
[45] Date of Patent: Apr. 13, 1993

[54] METHOD AND APPARATUS FOR ADAPTING A REMOTE COMMUNICATIONS CONTROLLER TO A VARIETY OF TYPES OF COMMUNICATIONS MODEMS

[75] Inventor: Richard C. Zelley, North Chelmsford, Mass.

[73] Assignee: Bull HN Information Systems Inc., Billerica, Mass.

[21] Appl. No.: 629,745

[22] Filed: Dec. 18, 1990

[51] Int. Cl.⁵ .................. G06F 3/00; H04M 11/00
[52] U.S. Cl. ..................... 395/325; 395/200; 375/8; 379/94; 364/929; 364/927.92; 364/964; 364/DIG. 2
[58] Field of Search .......... 364/DIG. 1, DIG. 2; 395/325, 200, 275, 725; 375/8; 379/94, 88, 93, 96, 442, 102; 340/825.06, 501, 870.18; 370/9, 32, 110.1; 371/8.2, 32, 34

[56] References Cited

U.S. PATENT DOCUMENTS

| | | | |
|---|---|---|---|
| 3,644,896 | 2/19 2 | Chaddha | 364/200 |
| 3,842,405 | 10/1974 | Key et al. | 364/200 |
| 3,967,250 | 6/1976 | Senda et al. | 395/575 |
| 3,984,817 | 10/1976 | Barbour et al. | 364/200 |
| 4,173,790 | 11/1979 | Abe et al. | 364/900 |
| 4,215,243 | 7/1980 | Maxwell | 179/2 DP |
| 4,263,670 | 4/1981 | Sherman | 375/9 |
| 4,387,440 | 6/1983 | Eaton | 379/98 |
| 4,850,032 | 7/1989 | Freeburg | 455/51 |
| 4,989,232 | 1/1991 | Tsumura | 379/88 |
| 5,107,456 | 4/1992 | Schuur | 395/325 |

OTHER PUBLICATIONS

"Microprocessor Implementation of High-Speed Data Modems", Van Gerwen et al., IEEE Transactions on Communications, vol. Com-25, No. 2, Feb. 1977.

*Primary Examiner*—Michael R. Fleming
*Assistant Examiner*—Gopal C. Ray
*Attorney, Agent, or Firm*—Gary D. Clapp; John S. Solakian

[57] ABSTRACT

A data processing system includes at least one modem connected from a communications link to the remote devices and at least one modem controller. A modem adaptor stores scripts for directing modem control related operation, each script being a sequence of links and each link directing a modem control related operation, a library of modem control subroutines, each subroutine corresponding to a link, and a link table relating each link to the corresponding subroutine. There is a set of scripts for each type of modem connected to the system.

16 Claims, 4 Drawing Sheets

METHOD AND APPARATUS FOR ADAPTING A REMOTE COMMUNICATIONS CONTROLLER TO A VARIETY OF TYPES OF COMMUNICATIONS MODEMS

CROSS REFERENCES TO RELATED PATENT APPLICATIONS

The following patent applications and patents which are assigned to the same assignee as the present patent application have related subject matter:

1. Data Processing System Having a Bus Command Generated by One Subsystem on Behalf of Another Subsystem, invented by George J. Barlow, Arthur Peters, Richard C. Zelley, Elmer W. Carroll, Chester M. Nibby, Jr., and James W. Keeley, Ser. No. 944,052 filed Dec. 18, 1986, since abandoned; first continued as U.S. patent application Ser. No. 07/547,527, filed Jun. 29, 1990, since abandoned, and second continued as U.S. patent application Ser. No. 07/773,752, filed Oct. 10, 1991.

2. Apparatus and Method of Loading A Control Store Memory of a Central Subsystem, invented by Richard C. Zelley, Mark J. Kenna, Jr., and Wallace A. Martland, Ser. No. 943,980, filed Dec. 18, 1986 and issued Apr. 3, 1990 as U.S. Pat. No. 4,914,576.

3. Apparatus and Method for Loading and Verifying A Control Store Memory of a Central Subsystem, invented by Chester M. Nibby, Jr., Richard C. Zelley, Kenneth E. Bruce George J. Barlow, and James W. Keeley, Ser. No. 943,984, filed Dec. 18, 1986 and issued Mar. 20, 1990 as U.S. Pat. No. 4,910,666.

4. Apparatus and Method of Loading Different Control Stores of a Multiprocessor to Provide a Multi-Personality System, Invented by Richard C. Zelley, Mark J. Kenna, Jr., and Wallace A. Martland, Ser. No. 943,985, filed Dec. 18, 1986, since abandoned.

5. Universal Peripheral Controller Self-Configuring Bootloadable Ramware, invented by John A. Klashka, Sidney L. Kaufman, Krzysztof A. Kowal, Richard P. Lewis, Susan L. Raisbeck and John L. McNamara, Jr., Ser. No. 925,431, filed Oct. 31, 1986 and issued Feb. 7, 1989 as U.S. Pat. No. 4,803,623.

6. System Management Apparatus for a Multiprocessor System, invented by George J. Barlow, Elmer W. Carroll, James W. Keeley, Wallace A. Martland, Victor M. Morganti, Arthur Peters and Richard C. Zelley, Ser. No. 869,164, filed May 30, 1986, since abandoned, and continued as Ser. No. 377,785, filed Jul. 6, 1989.

7. Memory System With Automatic Memory Reconfiguration, invented by Robert B. Johnson, Chester M. Nibby, Jr., and Edward R. Salas, Ser. No. 413,631, filed Sep. 3, 1982 and issued Mar. 26, 1985 as U.S. Pat. No. 4,507,730.

8. Memory Controllers With Burst Mode Capability, invented by Robert B. Johnson and Chester M. Nibby, Jr., Ser. No. 202,819, filed Oct. 31, 1980 and issued Dec. 28, 1982 as U.S. Pat. No. 4,366,539.

9. Resilient Bus System, invented by George J. Barlow and James W. Keeley, Ser. No. 717,201, filed Mar. 28, 1985 and issued Aug. 16, 1988 as U.S. Pat. No 4,764,862.

10. Multiprocessor Shared Pipeline Cache Memory With Split Cycle and Concurrent Utilization, invented by James W. Keeley and Thomas F. Joyce, Ser. No. 655,473, filed Sep. 27, 1984 and issued Sep. 22, 1987 as U.S. Pat. No. 4,695,943.

11. Method and Apparatus for Resetting A Memory Upon Power Recovery, invented by Raymond Bowden III, Michelle A. Pence, George J. Barlow, Mark E. Sanfacon and Jeffery S. Somers, Ser. No. 07/593,917, filed Oct. 5, 1990.

12. Method and Apparatus for Performing Health Tests of Units of a Data Processing System, invented by George J. Barlow, Richard C. Zelley and James W. Keeley, Ser. No. 07/593,408, filed Oct. 5, 1990.

13. Method and Apparatus for Memory Retry, invented by George J. Barlow, Raymond Bowden III and Michelle A. Pence, Ser. No. 07/593,182, filed Oct. 5, 1990.

14. Method and Apparatus for Integrity Testing of Fault Monitoring Logic, invented by David Cushing, Edward Hutchins, Elmer W. Carroll and James Bertone, Ser. No. 07/593,179, filed Oct. 5, 1990.

BACKGROUND OF THE INVENTION

Field of Use

The present invention relates to communications between a data processing system and, more particularly, to a method and apparatus for adapting a communications controller of the system to a plurality of types of communications modems.

Prior Art

Communication between a data processing system and remote devices, such as remote user terminals, other data processing systems and remote diagnostic facilities, is usually accomplished through a variety of communications links, such as phone lines, which are connected to the system through various communications modems, the modems being interfaced to and controlled by the system by means of communications controllers. The communications controller are in turn usually controller by programs which both control the modem itself and which control and execute the protocols through which the modems and communications links communicate with other, remote devices.

A recurring problem is that of adapting the system to use a number of different types of communications modems. That is, a given communications modem can be programmed to control a given type of modem, but the addition or substitution of a different type of modem requires that the controller be reprogrammed, that is, that the programs controlling the modem controller be replaced or supplemented with additional programs, particularly when the system may be required to adapt to an indefinite variety of modems.

The controller programs may be either soft loaded, that is, stored on disk or tape and loaded at system initialization or stored in firmware in the system units associated with performing remote communications operations.

Soft loading of the controller programs often not desirable due to the increase in software that must be loaded into the system at initialization. Perhaps more importantly, it is often undesirable to soft load the remote communications programs because many systems may either be initialized remotely or diagnosed for faults and error remotely, making it desirable that the necessary communications programs be kept in firmware and thereby available when power is applied to the system, without the need that the system be sufficiently operational to perform software loads. The storing of communications programs, such as the modem controller programs, in firmware, however, places severe restraints on the number of programs that can be stored in the system because of practical limitations on the amount of nonvolatile memory generally available. The result is that the system firmware cannot readily contain the full range of modem controller programs that would be desirable if the system were to be able to adapt to a full range of different possible types of modems.

The method and apparatus of the present invention addresses this and other problems of the systems of the prior art.

OBJECTS OF THE INVENTION

It is therefore an object of the present invention to provide an improved method and apparatus for adapting the communications, or modem, controllers of a system to a variety of different types of modems.

SUMMARY OF THE INVENTION

In the present invention, a data processing system includes a memory for storing programs for controlling communications between the data processing system and external devices and a processor responsive to the programs for performing communications operations. The system also includes at least one modem connected from a communications link to the remote devices and at least one controller responsive to the communications programs for controlling operations of the modems. The modem adaptor of the present invention stores scripts for directing operations related to control of a modem in a memory, wherein each script is comprised of a sequence of links and wherein each link directs a corresponding operation related to control of the modem. The adaptor includes a memory for storing a library of modem control subroutines, wherein each subroutine corresponds to a link and controls the corresponding, and a link table relating each link to the corresponding subroutine. The memory will generally contain a set of scripts for each type of modem connected to the system.

The system's processor which controls remote communications operations is responsive to a request for communication with a remote device for selecting and executing a corresponding program for the requested operation, including selecting and executing a script for controlling the modem associated with the remote device involved the requested operation. The processor is responsive to the links of the selected script, and to the link table for selecting and executing the corresponding modem control subroutines, and the communications controller is responsive to the selected subroutines for controlling the modem to perform the requested operation.

The present invention thereby allows the system, that is, the modem controller, to be adapted to a wide variety of different types of modems while requiring a minimum of nonvolatile memory. The present invention provides a set of links and library of corresponding modem controller subroutines that is sufficiently "rich" that a script may be written for virtually any modem, thereby insuring that the system may be adapted to virtually any modem. In addition, the present invention uses a library of modem control subroutines that are shared by the scripts, rather than having a complete subroutine program for each possible type of modem, so that the amount of program code, and thereby the requirements for nonvolatile memory space, are significantly reduced. Also, the program code that is necessarily unique to each modem is contained in the scripts, which in turn are comprised of short, simple links, or commands. The amount of additional memory space required to add a new modem to the system is thereby minimized, requiring only the addition of a new script or scripts which, by their construction from short links, require relatively little memory space.

The scripts for each type of modem include a call script for establishing communication between the system and a remote device when the communication is initiated by the data processing system, an answer script for establishing communication when initiated by the remote device, and a hang-up script which is used to terminate a connection between the system and a remote device when the communication has been completed.

The links are selected from a set of links and include a variety of types of links. One type are simple links, wherein each simple link contains only a command field stating an operation to be performed. Variable links each contain a command field and a variable field, the command field indicating the operation to be executed and the variable field containing a variable to be used in the operation. Value links each contain a command field and a value field, wherein the command field indicates the operation to be performed and the value field contains a set of alphanumeric characters which are to be sent to the modem or which are to be compared to a set of alphanumeric characters received from the modem. Finally, transmit links each contain a command field, a variable field, and a value field. The command field indicates that a transmit operation is to be performed, the value field contains a string of alphanumeric characters to be transmitted to the modem, and the value field defines a maximum time period in which to receive a response from the modem.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PREFERRED EMBODIMENT

Figure 1:
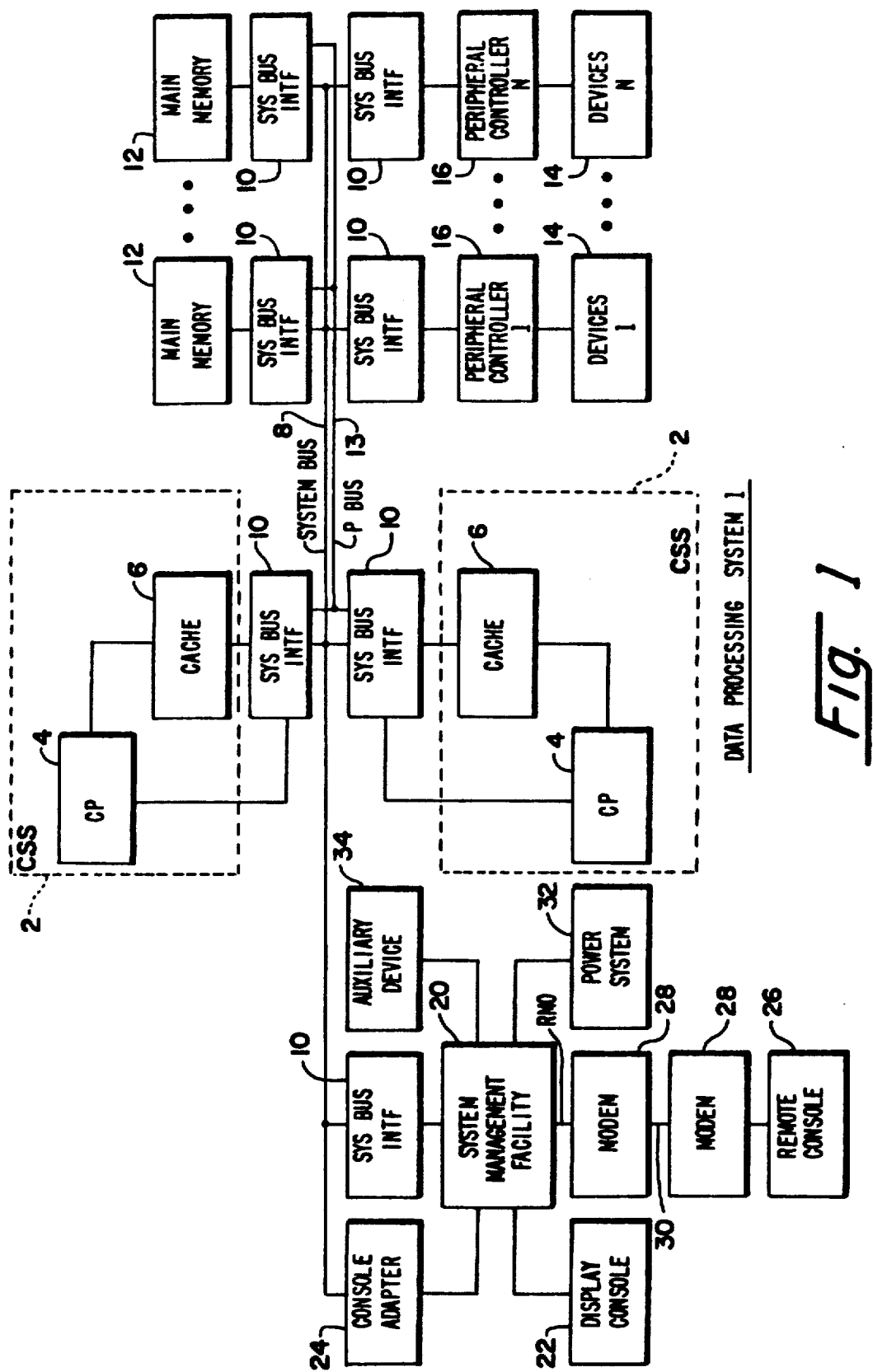
FIG. 1 is a block diagram of an exemplary system incorporating the present invention.

Referring to FIG. 1, therein is represented a block diagram of an exemplary system in which the present invention may be embodied. Data Processing System (DPS) 1 may be, for example, a DPS 6000 computer system from Bull HN Information Systems Inc. of Billerica, Mass. The following will describe the structure and operation of DPS 1 only briefly as such systems are generally well known and understood in the art and the exemplary system described specifically herein is described in detail in the previously referenced related patents.

As shown, multiprocessor Data Processing System (DPS) 1 includes a one or more functional units, including one or more Central Sub-Systems (CSSs) 2, each CSS 2 being comprised of a Central Processor (CP) 4 and a Cache 6. Each CP 4 and the Cache 6 of each CSS 2 have access to a System Bus (SYSBUS) 8 through a System Bus Interface (SBI) 10.

DPS 1's functional units include one or more Main Memories 12 (MMs 12), which are shared by the CSSs 2 and which are each connected to System Bus 8 through a SBI 10. In addition to SYSBUS 8, DPS 1 includes a Private Bus (PBUS) 13 which is connected between each of MMs 12 and each of the CSSs 2 with the MMs 12 and the CSSs 2 being connected to PBUS 13 through SBIs 10. PBUS 13 is provided as a means from private, high speed data reads from MMs 12 to CSSs 2, while general purpose data transfers and memory write operations are performed through SYSBUS 8.

DPS 1 also includes Peripheral Devices (PDs) 14, such as disk and tape drives and communications devices. Each PD 14 is connected to System Bus 8 through a SBI 10 and an appropriate corresponding Peripheral Device Controller (PDC) 16.

Finally, DPS 1's functional units include a System Management Facility (SMF) 20 with associated system management devices. SMF 20 provides centralized control of DPS 1. Among the operations controlled by SMF 20 are initialization of the DPS 1 system, initialization and control of Quality Logic Testing, that is, system fault testing and detection, and loading of operating system and applications software into MMs 12 and CSSs 2. SMF 20 also controls certain overall system operations, including system timing, monitoring of errors and faults, and monitoring of system operating temperature and system power.

Associated with SMF 20 are a Display Console 22 connected to SMF 20, which allows direct communication between a user and DPS 1, and a Console Adapter 24 which provides communication between Display Console 22 and System Bus 8 through SMF 20. Communication between a remote user, for example, using a Remote Console 26, is provided through a variety of communications links, such as phone lines, which are connected to SMF 20 through Modems 28 and Communications Links 30. Modems 28 and Communications Links 30 generally allow communications between the DPS 1 and other, external devices, such as remote systems and remote diagnostic facilities. Finally, SMF 20 includes a connection to Power System sensors and controllers 32 and to such Auxiliary Devices 34 as a printer.

Figure 2:
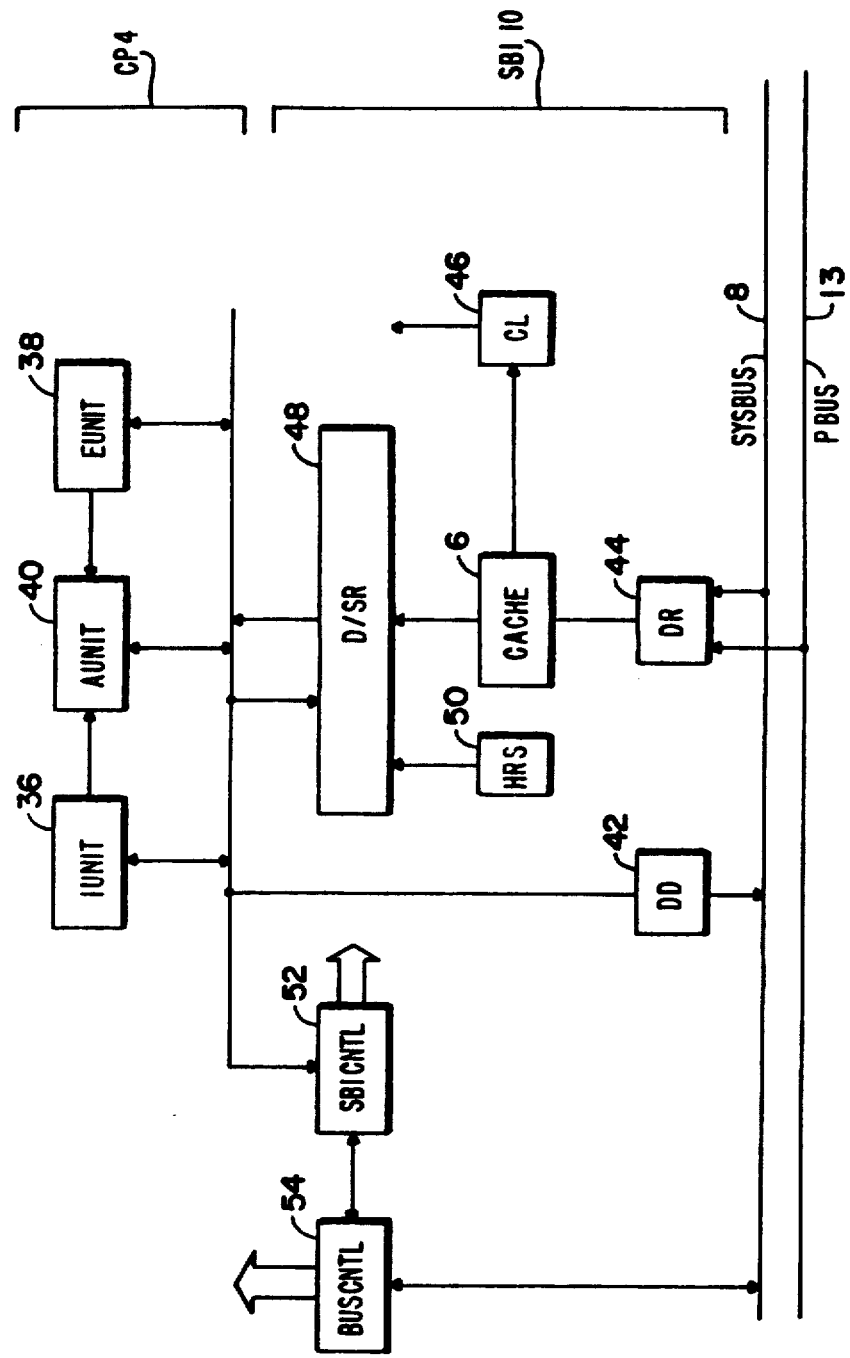
FIG. 2 is a block diagram of a central processing unit of the system incorporating the present invention.

Referring to FIG. 2, therein is represented a simplified block diagram of a CSS 2 with those portions of a CSS 2 comprising CP 4 and SBI 10 being generally indicated by brackets.

First considering the CP 4, each CP 4 is comprised of a an Instruction Unit (IUNIT) 36 which receives and decodes instructions to provide control outputs to the other elements of the CP 4, and Execute Unit (EUNIT) 38, which performs the actual data processing operations, and an Address Unit (AUNIT) 40, which is responsive to IUNIT 36 and EUNIT 38 to perform address translation functions and to control the reading and writing of data and instructions to and from MM 12 and CACHE 6. As the function and operation of processing unit elements such as IUNIT 36, EUNIT 38 and AUNIT 40 are well known and understood by those of ordinary skill in the art, these units will not be discussed in further detail herein. In addition, these units of the exemplary system are well described in the previously referenced related patents.

Referring to the SBI 10 related portions of the CSS 2, certain elements of SBI 10, such as CACHE 6, may in this and other systems be equally well regarded as a part of the CP 4 as the SBI 10, but is represented herein as part of SBI 10.

An SBI 10 includes Data Drivers (DDs) 42, comprised of line drivers, for transferring information from the CP 4 and SBI 10 to System Bus 8 and Data Receivers (DRs) 44, comprised of line receivers, for receiving information from System Bus (SYSBUS) 8 and Private Bus (PBUS) 13.

In the system illustrated herein, the outputs of DRs 44 are connected into a Cache 6, which stores the information received from SYSBUS 8 and PBUS 13 for subsequent acceptance by the CP 4 or the functional logic of the SBI 10. In alternate embodiments, the element shown as Cache 6 may be implemented as a set of registers for receiving the data and instructions from SYSBUS 8 and PBUS 13, or as a set of registers arranged as a First-In-First-Out (FIFO) memory, rather than as a full cache.

Cache 6 in turn provides outputs to Control Logic (CL) 46, which provides control outputs to the CP 4 to direct certain operations of the CP 4, for example, the loading of firmware into the CP 4 at system initialization. Cache 6 also provides outputs to Data/Interrupt/Syndrome Registers (DIS) 48, which in turn provides data, interrupt commands and instructions, received from SYSBUS 8 and PBUS 13 and through Cache 6, to the CP 4. DIS 48 also receives and stores certain information from the CP 4, such as fault and status or "syndrome" information, for subsequent transmission to other units of DPS 1, such as SMF 20.

Associated in turn with DIS 48 is a Hardware Revision Store (HRS) 50 for storing information identifying the particular revision or configuration of the hardware comprising the CSS 2. As is described in the referenced related patents, this information is read from the HRS 50 of the CSS 2 by SMF 20 at system initialization to select the particular matching revision of the firmware controlling the operation of the CSS 2.

Finally, SBI 10 includes an SBI Control (SBICNTL) 52 containing the timing and logic functions necessary to control the operations of the SBI 10 and a Bus Control (BUSCNTL) 54 for controlling the operations of SBI 10 with respect to bus transfer operations between the SBI 10 or the CSS 2 and other units of DPS 1, such as SMF 20.

BUSCNTL 54 is responsible for controlling bus operations for both SBI 10 and CP 4 and provides access from SYSBUS 8 to many of the individual registers of SBI 10, IUNIT 36, EUNIT 38 and AUNIT 40. SMF 20, for example, may read from and write to many of the individual registers of the elements of CP 4 which are directly accessible through the pins of the integrated circuit chips. SMF 20 may in turn read and write many of the internal registers of these elements by using the internal data paths of IUNIT 36, EUNIT 38 and AUNIT 40.

When a particular bus operation involves the SBI 10, BUSCNTL 54 will interact with SBICNTL 52, providing the control and timing signals as necessary to direct SBICNTL 52 in controlling the operations of SBI 10 as necessary to execute the bus operation. If the bus operation involves the CSS 2, BUSCNTL 70 will interact in a similar manner with the control logic of the CSS 2 to execute the bus operation. Both BUSCNTL 70 and SBICNTL 68 are conventional and are described in further detail in the referenced related patents and accordingly their detailed designs will not be described further as such functions are familiar to those of ordinary skill in the art.

Briefly considering the bus operations executed by the units of DPS 1, as was previously described, the various units of DPS 1, such as SMF 20 and a CSS 2 may communicate through SYSBUS 8 by executing the protocols for bus transfer operations described in the previously referenced related patents. The various signals used in the bus transfer operations include address and data fields, for communicating, for example, the identity of a system unit with which is the recipient of a bus request, the address of a memory location or register within the unit which is to be read or written to, fields indicating the type of operation to be performed, for example, a read or write operation, and various control and handshake signals.

Each bus operation is executed in a single phase. The system unit initiating the operation, referred to as the master unit for the operation, asserts a request for a bus transfer operation by placing control, handshake and address signals on the appropriate lines of SYSBUS 8, to initiate the operation, while simultaneously placing the data to be transferred on the data lines of SYSBUS 8. The control, handshake and address signals include signals indicating the type of operation to be performed, the identity of the system unit which is the target of the request, and the address of the location within the system unit which is the target, or recipient of the request, referred to as the slave unit for the operation. The slave unit then responds to the request by either accepting the request and the data or by refusing the request, for example, by refusing to acknowledge the request, by asking the master unit to wait, or by simply not responding.

If the operation requires a response from the target system unit, for example, when a CSS 2 requests a read of data from a MM 12, the target of the initial request will in turn initiate a subsequent bus transfer operation in response to the initial bus operation, but with the original target unit now being the master unit for the bus operation and the original master unit being the target unit.

It should be noted, with respect to bus operations, that BUSCNTL 54 also includes bus access arbitration logic which, when presented with conflicting requests for bus operations from two or more system units, resolves the requests to grant access to the requesting unit having the highest assigned priority.

Figure 3:
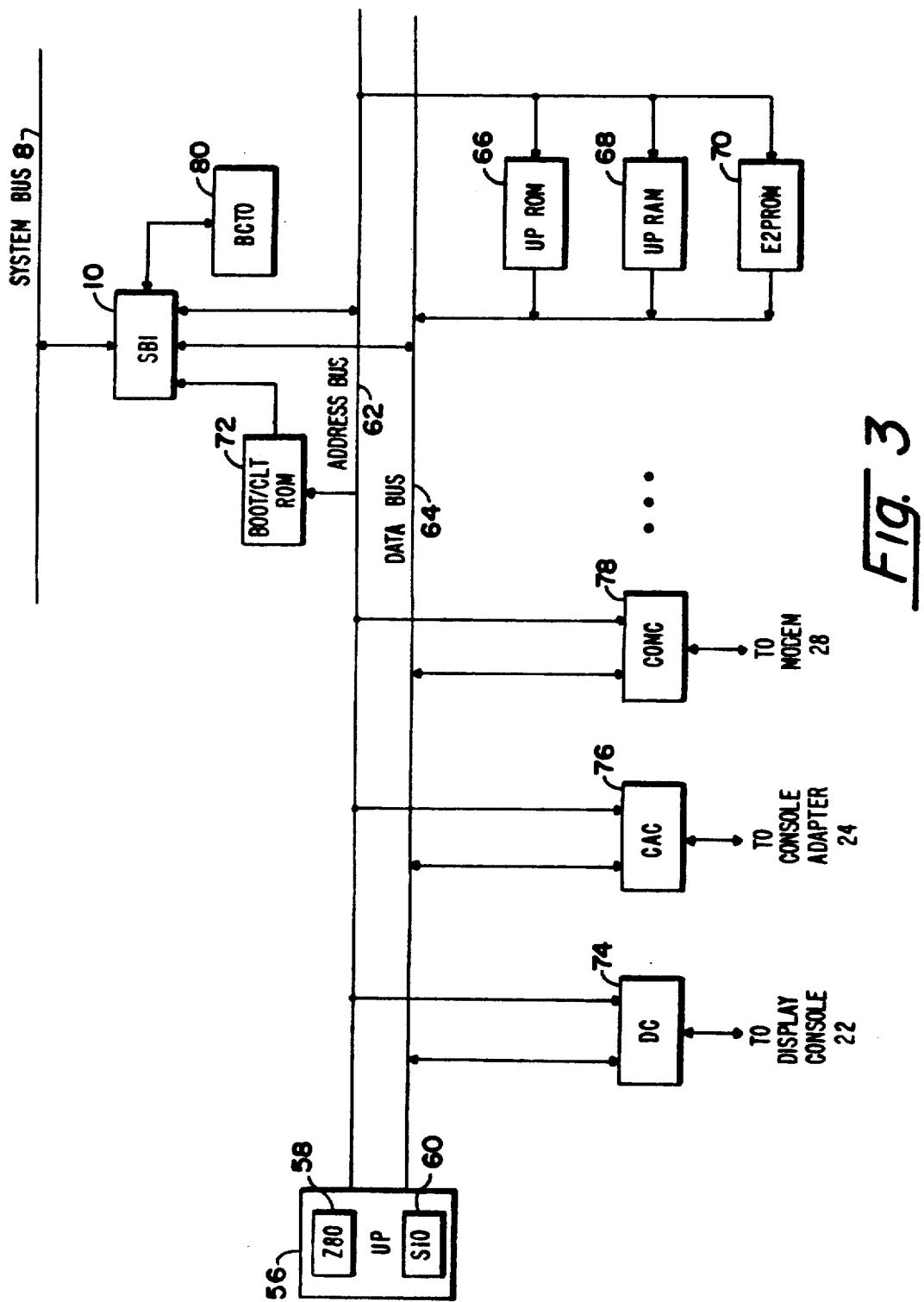
FIG. 3 is a block diagram of a system manager of the exemplary system.

Referring to FIG. 3, therein is presented a simplified block diagram of SMF 20. As shown, SMF 20 is essentially a general purpose central processing unit executing programs designed to perform specialized functions. Among these functions are system initialization and test, including the initial loading of microcode routines into the CSS 2s and the loading of Quality Logic Test (QLT) programs into the MM 12s and the execution of such QLT programs to test the proper operation of DPS 1 and detect errors or faults in the operations of the CSS 2s, MM 12s and other units of DPS 1. As will be described further below, SMF 20 also controls communications between DPS 1 and other systems or facilities through the Communications Links 30.

SMF 20 includes a Microprocessor Unit (UPU) 56, which controls and performs the operations of SMF 20 under direction of programs stored in SMF 20's memory elements. In addition to other operational elements, SMF 20 includes a Microprocessor 58 (UP 58), such as a Z80 microprocessor from Zilog Corporation, and a Serial Input/Output Handler 60 (SIO 60), also from Zilog Corporation.

As will be discussed further and as is well understood by those of ordinary skill in the art, UP 58 executes the actual data and control operations of UPU 56 while SIO 60 operates as an input/output device for UP 58, in particular with respect to interrupt inputs to UP 58.

An Address Bus 62 and a Data Bus 64 connects UPU 56 and the other elements of SMF 20 for communication of data and instructions among the element of SMF 20.

The memory elements of SMF 20 include a Microprocessor Read Only Memory (UPROM) 66, which stores the programs directly controlling UPU 56, that is, UPU 56's microcode routines. Data used by and generated SMF 20 and certain programs controlling the operations of SMF 20 are stored in a Microprocessor Random Access Memory (UPRAM) 68, as is typical in most computer systems.

An Electronically Erasable Programmable Read Only Memory (E2PROM) 70 is provided for long term storage of certain programs and information which are to be permanently resident in SMF 20, unless deliberately erased or overwritten by the system user. Such programs could include the initialization program, or bootload program, for SMF 20, passwords and password programs for controlling access to DPS 1 and SMF 20, information identifying the Peripheral Device 14 storing the system initialization (boot) software, MM 12 locations assigned for specific functions, such as storing boot and QLT programs, information as to which test programs are to be executed and the results to be expected from such programs, and information as to which of Peripheral Devices 14 contain the programs or microcode for controlling CSS 2s.

E2PROM 70 will also store and provide system related information which changes infrequently and which it is therefore advantageous to have permanently resident in the system, such as system parameters, system option choices, and default values. As will be described, E2PROM is also used to store certain programs of the present invention.

Finally, a Boot and QLT Read Only Memory (BOOT/QLT ROM) 72 is provided to store programs for controlling operation of DPS 1 during initialization, such as a programs for controlling the initial loading, or booting, of software into DPS 1 and for selecting QLT programs to be executed at system initialization.

SMF 20 also includes a number of device controllers for controlling the peripheral devices of SMF 20, such as a Display Controller (DC) 74 for interfacing SMF 20 with Display Console 22, a Console Adapter Controller (CAC) 76 for interfacing SMF 20 to Console Adapter 24, and a Communications Controller (COMC) 78 for interfacing SMF 20 with Modem 28.

Finally, the elements of SMF 20 are connected, through A Bus 74 and D Bus 76, to System Bus 8 through an SBI 10, which may differ in detail from that previously described with reference to CSS 2 but which performs the same general functions with respect to bus operations. BOOT/QLT ROM 72 which, as described, stores programs for controlling the initialization and testing of other units of DPS 1, such as the CSS 2s and MM 12s, is connected directly through SBI 10 to System Bus 8, as is Bus Control Time Out 80 (BCTO 80), which monitors SYSBUS 8 operations to detect failed operations, that is, requests for bus transfer operations wherein the target unit has not responded to a bus request within the allowed time-out period.

SMF 20 will not be described in further detail as the general structure and operation of such units in a system, are, in general, well known in the art and are described in detail in the referenced related patents.

Figure 4:
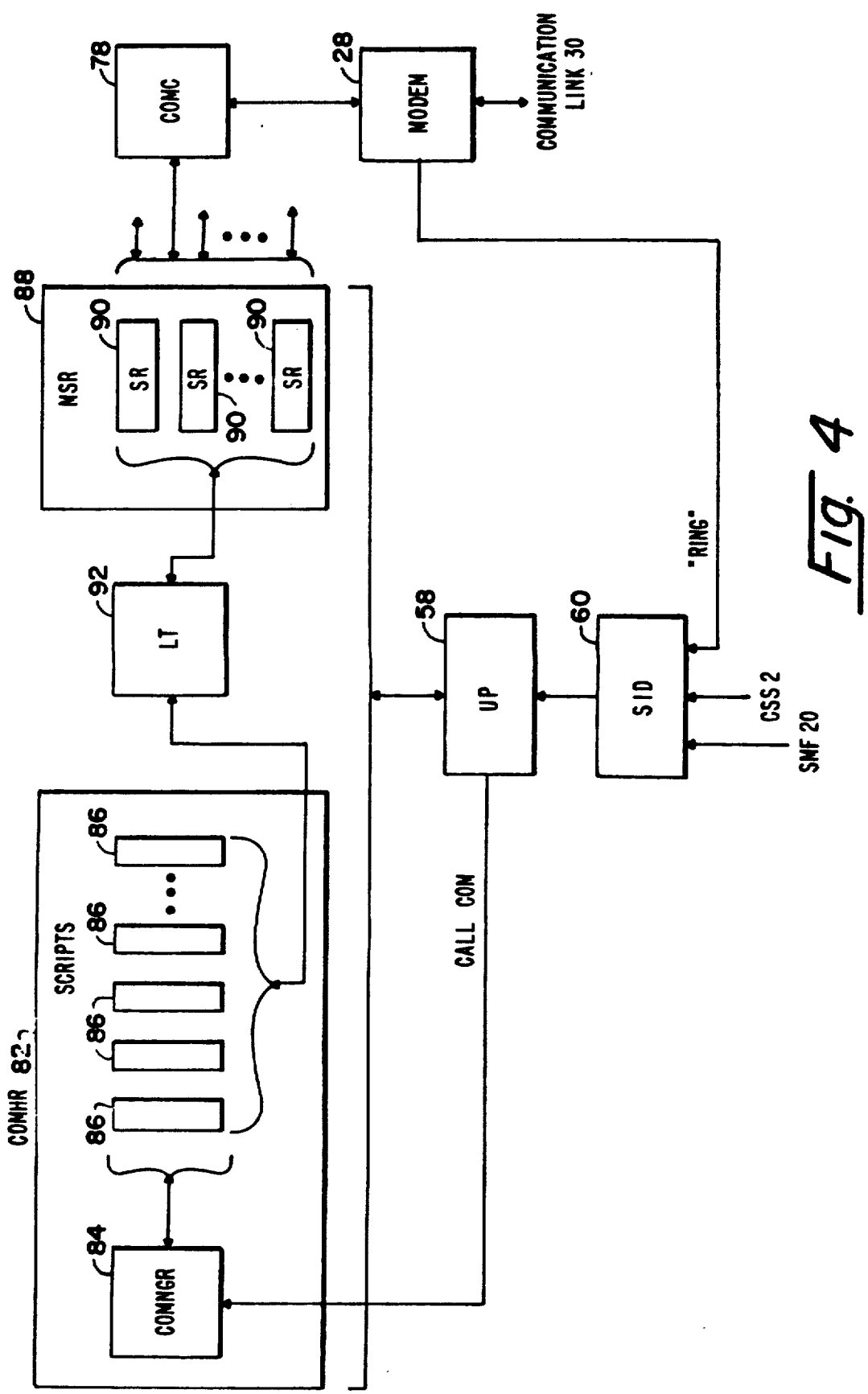
FIG. 4 is an illustrative diagram of the modem adaptor of the present invention.

Referring now to FIG. 4, therein is shown a diagrammatic representation of the present invention. As was described, communications between a DPS 1 and the external world, such as a Remote User Console 26, a remote diagnostic facility and other systems are through a Modem 28 and a Communications Link 30, wherein, as indicated in FIG. 4, DPS 1 may have a plurality of Communications Links 30 and Modems 28. SMF 20 controls such communications operations by providing the appropriate control and command signals to the appropriate Modem 28 and by executing the appropriate data communications protocols through the corresponding Communications Link 30 with the remote device with which the DPS 1 is communicating. As was also described, all SMF 20 operations are performed under the direction and control of the UPU 56's UP 58, which in turn operates under the direction and control of programs stored in UPROM 66, UPRAM 68 and E2PROM 70.

Requests for communications operations are presented to UPU 56 in the form of interrupt signals. These interrupt signals are received by SIO 60, which in turn generates the corresponding commands to UP 58 for UP 58 to execute a corresponding interrupt handling routine. As is well known in the art, an interrupt command will cause a processor unit to suspend execution of a current operation being performed by the processor, and a branch to a sequence of instructions, referred to as an "interrupt handling routine", which directs the processor to take the appropriate actions with regard to the interrupt.

The processor will then return to the original operation when the interrupt has been "handled". In this instance, the appropriate routine for "handling" an interrupt which is a request for a communications operation will result in SMF 20 performing the requested communications operation between DPS 20 and the remote device, for example, a read of error and fault data from the DPS 1 to a remote diagnostic facility.

As indicated in FIG. 4, there are three primary sources of communication request interrupts to SIO 60. One source is the Modems 28, which respond to a communications request from a remote device by generating a "Ring" signal interrupt to SIO 60. A remote device may initiate such a communication for a data exchange, for example, to read fault and error monitoring data from DPS 1 or to read data or programs into DPS 1.

A second source is SMF 20 itself. As was described, SMF 20 monitors the operations and performance of DPS 20 and, for example, upon detecting an error or fault condition in DPS 1, such as a failure of a DPS 1 unit to respond to a bus operation request, may transmit an indication of that error or fault, together with other fault monitoring information, to a remote diagnostic facility.

The third primary source of communications operation interrupts are the CSS 2s. For example, a CSS 2 may be executing a program which requires the exchange of data with a remote device, such as another system. In another example, each CSS 2 contains programs for detecting fault or errors in their own operations or in the operations of other units of DPS 1 and these programs may cause the CSS 2 to request a communication operation to notify a remote diagnostic of the fault.

As is well known to those of ordinary skill in the art, each request, or interrupt, for a communications operation with a remote device contains an identification of the particular "device", that is, modem, which is either the source of the interrupt or which is to service the interrupt.

For example, in the case of a communication operation initiated by a remote device, the Modem 28 receiving the signals requesting the operation provides its own identification. That is, a "Ring" interrupt from "device 16" identifies the type of Modem 28 which will be involved in the operation, that is, the interrupt itself identifies the source of the interrupt, for example, "device 16", thereby identifying implicitly the port the Modem 28 which has generated the interrupt is on. When SMF 20 or a CSS 2 generates a request for communication with a remote device, that request will identify the particular remote device, for example, another system or a diagnostic facility, that the system wishes to communicate with. That identification of the remote device in the request identifies the local "device", that is, Communications Link 30 and Modem 28, to be used for the operation, thereby identifying the particular type of Modem 28 involved in the operation.

The receipt of a communications request/interrupt by SIO 60 will cause SIO 60 to generate the appropriate commands to UP 58 to cause UP 58 to suspend the execution of a current operation and to branch to the execution of the appropriate communications routines. These communications control routines are represented in FIG. 4 as Communications Routines (COMMR) 82 and may reside, for example, in UPRAM 68, being loaded into UPRAM 68 upon system initialization.

UP 58 calls the appropriate COMR 82 routine by means of a Call Communications (CALLCOM) address which points to the location in UPRAM 68 of the selected communications routine. The instructions of the selected COMMR 82 routine are read to UP 58 in the usual manner to control the operation of SMF 20 so as to perform the selected communications operation. These operations of SMF 20 and the general structure and operation of program routines such as COMMNGR 82 are well known to those of ordinary skill in the art and will not be described further.

As is indicated in FIG. 4, for the purposes of the present invention, COMR 82 contains two primary groups of routines. The first group of communications routines, identified as Communications Manager Routines (COMNGR) 84, contains the routines for overall administration of communications operations, control of the flow of the information communicated, control of UP 58, and so forth, including all of the remote communications routines not directly concerned with control of the Modems 28.

The second group of COMR 82 routines contains the routines directly involved in control of the Modems 28. As was discussed previously, and is indicated in FIG. 4, there may be a substantial number and variety of Modems 28, together with corresponding their corresponding COMCs 78, connected from the system. Each type of Modem 28 may require different sequences and protocols to control their operations and functions. The present invention provide a means and method for readily adapting these communications routines to the various modems without requiring substantial reprogramming of SMF 20, that is, without requiring that SMF 209 be provided with a new set of modem control routines for each new type of modem added to the system.

In the present invention, the modem control routines reside in "scripts", which are stored in E2PROM 70. Each script contains a sequence of commands, or "links", for controlling the operation of a particular type of Modem 28 for a particular type of modem operation, so that there may be a set of scripts for each type of modem connected to the system. For example, in the present implementation of the system there is, for each type of modem connected to the system, a script for controlling the "CALL" operation, a script for controlling the "ANSWER" operation, and a script for controlling the "HANG-UP" operation, although other types of scripts may be added as necessary. As is apparent from the names assigned to these two types of scripts, the "CALL" script causes DPS 1 to establish communications with a remote device, such as another system, while the "ANSWER" script responds to a call from a remote device be accepting the establishment of communications by the remote device. The "HANG-UP" script terminates the connection between the system and the remote device when the communication is ended.

The COMNG 84 routines, which control all other remote communications related operations of SMF 20, call the appropriate SCRIPTs 84 to cause the particular Modem 28 involved in a remote communication operation to perform the desired functions. The appropriate SCRIPT 86 is selected using the information contained in the remote communications interrupt/request which identifies the particular operation to be done to the Modem 28 which is involved in the operation.

As described, in the present implementation of the invention, SCRIPTs 86 reside in E2PROM 70 and are thereby effectively permanently resident in the system. New SCRIPTs 86 may be written into E2PROM 70 as necessary, either by a user, for example, through a DISPLAY CONSOLE 22 or a REMOTE CONSOLE 26 or under software control, for example, from a remote system, or by writing a new set of scripts into E2PROM from a diskette, and these new scripts will become "permanently" together with any other already resident SCRIPTs 84.

Examples of SCRIPTs 86 are shown in Appendix A for a variety of types of Modems 28. As may be seen from the example SCRIPTS 86, each script is comprised of a sequence of commands, or instructions, referred to as "links", which are selected from a set of links. This set of links contains a sufficient number of types of links to allow scripts to be written for virtually any type of Modem 28. The system may contain scripts for each type of modem that is or is reasonably expected to be connected to the system, but will usally contain only the scripts for the set of modems actually connected to the system.

The present set of links and the definitions of the various types of links is presented in Appendix B.

As shown in the set of links, there are four basic types of link, or instruction, for scripts and, as will be described further below, there is a corresponding subroutine for each link. While all of the links and their corresponding subroutines are related to control of the modems, certain links and subroutines are directly associated with controlling modem functions and operations while other links are, for example, programming commands used to construct the links, such as the branch commands.

The first type of link is referred to as a simple link containing only a command field stating an operation to be performed, such as "RT", or "Return from this Routine".

The second type, referred to as a variable link, contains a command field and a variable field. The command field indicates the operation to be executed and the variable field states a variable value to be used in the operation. An example of a variable link is the link "BRDD" wherein the command field "BR" describes the operation to be executed, in this case "Branch by a designed (variable) number of bytes", usually to another link. The variable field "DD" designates the number of bytes for the branch; for example, a "DD" variable of "16" indicates that the branch is forward (+) by 16 bytes. In further example, the related variable link "BR-DD" calls for a branch backwards (−) by "DD" bytes.

The third type of link is referred to as a value link and contains a command field and a value field. Again, the command field designates the operation to be performed but the value field contains a set of alphanumeric characters which are to be sent to the modem. For example, the value link CP"WWW" commands that the value contained in the value field between the " marks, herein shown as WWW, be compared with an answer received from execution of the TR link; for example, CP"10" would instruct that the received value be compared with the value "10" for transmission by the modem to the modem at the remote device.

Finally, there are transmit links which contain a command field, a variable field, and a value field. The transmit link is generally used to transmit strings of alphanumeric characters to the modem and to check for a response from the modem. For example, the transmit link XRTT"XXXXXX" contains a command field XR, a variable field TT and a value field "XXXXXX" and instructs that the string XXXXXX between the " marks be transmitted (XR) to the modem and that the routine wait a maximum of TT seconds for a response from the modem.

Referring again to FIG. 4, the detailed control of Modems 28 is provided through Modem Subroutines 88 (MSR 88) which resides in E2PROM 70. MSR 88 is a library of subroutines for controlling the detailed operations of the modems which are or may be connected from DPS 1 and contains a Subroutine (SR) 90 for link of the set of possible links. When a modem control operation is being executed, the appropriate SRs 90 are read from MSR 88 by UP 58 and to the corresponding Communications Controller 78 to the Modem 28 involved in the operation to control the detailed operation of the modem. Examples of SRs 90 are shown in Appendix C.

Finally, the various links or the SCRIPTs 86 and the corresponding SRs 90 of MSR 88 are related through a look-up Link Table (LT) 92, which is shown in Appendix D. That is, each link in the SCRIPTS 86 is converted to a corresponding pointer into a corresponding SR 90 in MSR 88. In return, when an SR 90 has completed execution, the subroutine returns to LT 92 and uses the link table in reverse to identify the link to which the subroutine returns.

In summary, therefore, the scripts, link table and subroutines of the present invention allow the remote communications operations of DPS 1 to adapt to any modem which may be connected from DPS 1. The present invention provides a set of links which may be combined into scripts for controlling any given modem, and a library of subroutines, each subroutine corresponding to a given link, for controlling the detailed operations of such modem in response to the links of the scripts.

While the invention has been particularly shown and described with reference to a preferred embodiment of the method thereof, it will be understood by those of ordinary skill in the art that various changes in form, details and implementation may be made therein without departing from the spirit and scope of the invention as defined by the appended claims.

Appendix A

HAYES COMPATIBLE "AT" COMMAND SET MODEM ANSWER (113)

```
     CK090     SET TOTAL ROUTINE TIME TO 90 SECONDS
     TTH       TEST TO FORCE A HANG UP.
     BF12      NO
     RS8       RESET DATA TERMINAL READY
     RS5       RESET READY TO SEND
     WT05      GIVE MODEM ENOUGH TIME TO HANG UP
     RT        RETURN
*    SS8       SET DATA TERMINAL READY
     SS5       SET REQUEST TO SEND
     WT02      WAIT 2 SECONDS
     XR05"+++"
               TRANSMIT THE STRING +++ AND WAIT A MAXIMUM OF 05
               SECONDS FOR AN ANSWER BACK FROM THE MODEM
     WT02      WAIT 2 SECONDS
     XR30"AT&FVOEO&C1&D2&WA."
               TRANSMIT THE STRING AT&FVOEO&C1&D2&WA. AND WAIT A
               MAXIMUM OF 30 SECONDS FOR AN ANSWER BACK FROM THE
               MODEM.  "." IS A CARRIAGE RETURN IN THE STRING.
     CP"10"    COMPARE ANSWER TO 10 "CONNECT 2400"
     BT14      BRANCH 14 BYTES (CHARACTERS) FORWARD IF PREVIOUS TEST
               WAS TRUE
     CP"5"     COMPARE ANSWER TO 5 "CONNECT 1200"
     BT05      BRANCH 05 BYTES (CHARACTERS) FORWARD IF PREVIOUS TEST
               WAS TRUE
*    SSE       SET ERROR FLAG
     RT        RETURN
*    TT7       TEST IF DATA SET READY IS TRUE
     BF-08     BRANCH 08 BYTES (CHARACTERS) BACKWARD IF PREVIOUS TEST
               WAS FALSE
     TT9       TEST IF DATA CARRIER DETECT READY IS TRUE
     BF-08     BRANCH 08 BYTES (CHARACTERS) BACKWARD IF PREVIOUS TEST
               WAS FALSE
     RT        RETURN GOOD EXIT
```

HAYES COMPATIBLE "AT" COMMAND SET MODEM AUTO DIAL OUT (126)

```
     CK120     SET TOTAL ROUTINE TIME TO 120 SECONDS
     SS8       SET DATA TERMINAL READY
     SS5       SET REQUEST TO SEND
     XR03"AT&FVOEO&C1HO."
               TRANSMIT THE STRING AT&FVOEO&C1HO AND WAIT A MAXIMUM OF
               03 SECONDS FOR AN ANSWER BACK FROM THE MODEM.  "." IS A
               CARRIAGE RETURN IN THE STRING.
     CP"O"     COMPARE ANSWER TO O "OKAY"
     BT05      BRANCH 05 BYTES (CHARACTERS) FORWARD IF PREVIOUS TEST
               WAS TRUE
*    SSE       SET ERROR FLAG
     RT        RETURN
*    XR30"AT&FVOEO&C1&D2&W."
               TRANSMIT THE STRING AT&FVOEO&C1&D2&W AND WAIT A MAXIMUM
               OF 30 SECONDS FOR AN ANSWER BACK FROM THE MODEM.  "."
```

```
                    IS A CARRIAGE RETURN IN THE STRING.
CP"O"               COMPARE ANSWER TO O "OKAY"
BF-38               BRANCH 38 BYTES (CHARACTERS) BACKWARD IF PREVIOUS TEST
                    WAS FALSE
TN90                TRANSMIT THE NUMBER FIELD TO THE MODEM AND WAIT A
                    MAXIMUM OF 90 SECONDS FOR AN AMSWER BACK FROM THE MODEM
CP"10"              COMPARE ANSWER TO 10 "CONNECT 2400"
BT10                BRANCH 10 BYTES (CHARACTERS) FORWARD IF PREVIOUS TEST
                    WAS TRUE
CP"5"               COMPARE ANSWER TO 5 "CONNECT 1200"
BF-62               BRANCH 62 BYTES (CHARACTERS) BACKWARD IF PREVIOUS TEST
                    WAS FALSE
WT06                WAIT 6 SECONDS
TT7                 TEST IF DATA SET READY IS TRUE
BF-74               BRANCH 74 BYTES (CHARACTERS) BACKWARD IF PREVIOUS TEST
                    WAS FALSE
TT9                 TEST IF DATA CARRIER DETECT READY IS TRUE
BF-82               BRANCH 82 BYTES (CHARACTERS) BACKWARD IF PREVIOUS TEST
                    WAS FALSE
HS                  DO THE HANDSHAKING BETWEEN THE SMF AND THE REMOTE UNIT.
RT                  RETURN GOOD EXIT

HAYES COMPATIBLE "AT" COMMAND SET MODEM WITH MNP ANSWER (118)

CK090         SET TOTAL ROUTINE TIME TO 90 SECONDS
      TTH           TEST TO FORCE AN HANG UP.
      BF12          NO
      RS8           RESET DATA TERMINAL READY
      RS5           RESET REQUEST TO SEND
      WT05          GIVE MODEM ENOUGH TIME TO HANG UP
      RT            RETURN
  *   SS8           SET DATA TERMINAL READY
      SS5           SET REQUEST TO SEND
      WT02          WAIT 2 SECONDS
      XR05"+++"
                    TRANSMIT THE STRING +++ AND WAIT A MAXIMUM OF 05
                    SECONDS FOR AN ANSWER BACK FROM THE MODEM
      WT02          WAIT 2 SECONDS
      XR30"AT&FV0E0&C1\N3X1&D2&WA."
                    TRANSMIT THE STRING AT&FV0E0&C1\N3X1&D2&WA AND WAIT A
                    MAXIMUM OF 30 SECONDS FOR AN ANSWER BACK FROM THE
                    MODEM.  "." IS A CARRIAGE RETURN IN THE STRING.
      CP"10"        COMPARE ANSWER TO 10 "CONNECT 2400"
      BT14          BRANCH 14 BYTES (CHARACTERS) FORWARD IF PREVIOUS TEST
                    WAS TRUE
      CP"5"         COMPARE ANSWER TO 5 "CONNECT 1200"
      BT05          BRANCH 05 BYTES (CHARACTERS) FORWARD IF PREVIOUS TEST
                    WAS TRUE
  *   SSE           SET ERROR FLAG
      RT            RETURN
  *   TT7           TEST IF DATA SET READY IS TRUE
      BF-08         BRANCH 08 BYTES (CHARACTERS) BACKWARD IF PREVIOUS TEST
                    WAS FALSE
      TT9           TEST IF DATA CARRIER DETECT READY IS TRUE
      BF-08         BRANCH 08 BYTES (CHARACTERS) BACKWARD IF PREVIOUS TEST
                    WAS FALSE
      RT            RETURN GOOD EXIT

HAYES COMPATIBLE "AT" COMMAND SET MODEM AUTO DIAL OUT WITH MNP (150)

CK120         SET TOTAL ROUTINE TIME TO 120 SECONDS
      SS8           SET DATA TERMINAL READY
      SS5           SET REQUEST TO SEND
```

|   |   |   |
|---|---|---|
|   | XR03"AT&FVOE0&C1H0." | |
|   |   | TRANSMIT THE STRING AT&FVOE0&C1H0 AND WAIT A MAXIMUM OF 03 SECONDS FOR AN ANSWER BACK FROM THE MODEM. "." IS A CARRIAGE RETURN IN THE STRING. |
|   | CP"0" | COMPARE ANSWER TO 0 "OKAY" |
|   | BF37 | BRANCH 37 BYTES (CHARACTERS) FORWARD IF PREVIOUS TEST WAS FALSE |
|   | XR30"AT&FVOE0&C1\N3X1&D2&W." | |
|   |   | TRANSMIT THE STRING AT&FVOE0&C1\N3X1&D2&W AND WAIT A MAXIMUM OF 30 SECONDS FOR AN ANSWER BACK FROM THE MODEM. "." IS A CARRIAGE RETURN IN THE STRING. |
|   | CP"0" | COMPARE ANSWER TO 0 "OKAY" |
|   | BT05 | BRANCH 05 BYTES (CHARACTERS) FORWARD IF PREVIOUS TEST WAS TRUE |
| * | SSE | SET ERROR FLAG |
|   | RT | RETURN |
| * | TN90 | TRANSMIT THE NUMBER FIELD TO THE MODEM AND WAIT A MAXIMUM OF 90 SECONDS FOR AN AMSWER BACK FROM THE MODEM |
|   | CP"23" | COMPARE ANSWER TO 23 "CONNECT 2400 +MNP" |
|   | BT30 | BRANCH 30 BYTES (CHARACTERS) FORWARD IF PREVIOUS TEST WAS TRUE |
|   | CP"22" | COMPARE ANSWER TO 22 "CONNECT 1200 +MNP" |
|   | BT20 | BRANCH 20 BYTES (CHARACTERS) FORWARD IF PREVIOUS TEST WAS TRUE |
|   | CP"10" | COMPARE ANSWER TO 10 "CONNECT 2400" |
|   | BT10 | BRANCH 10 BYTES (CHARACTERS) FORWARD IF PREVIOUS TEST WAS TRUE |
|   | CP"5" | COMPARE ANSWER TO 5 "CONNECT 1200" |
|   | BF-49 | BRANCH 49 BYTES (CHARACTERS) BACKWARD IF PREVIOUS TEST WAS FALSE |
| * | WT06 | WAIT 6 SECONDS |
|   | TT7 | TEST IF DATA SET READY IS TRUE |
|   | BF-67 | BRANCH 67 BYTES (CHARACTERS) BACKWARD IF PREVIOUS TEST WAS FALSE |
|   | TT9 | TEST IF DATA CARRIER DETECT READY IS TRUE |
|   | BF-75 | BRANCH 75 BYTES (CHARACTERS) BACKWARD IF PREVIOUS TEST WAS FALSE |
|   | HS | DO THE HANDSHAKING BETWEEN THE SMF AND THE REMOTE UNIT. |
|   | RT | RETURN GOOD EXIT |

FLEXTEL 2222P HAYES COMPATIBLE "AT" COMMAND SET MODEM ANSWER (147)

|   |   |   |
|---|---|---|
|   | CK090 | SET TOTAL ROUTINE TIME TO 90 SECONDS |
|   | TTH | TEST TO FORCE AN HANG UP. |
|   | BF12 | NO |
|   | RS2 | RESET DATA TERMINAL READY |
|   | RS5 | RESET REQUEST TO SEND |
|   | WT05 | GIVE MODEM ENOUGH TIME TO HANG UP |
|   | RT | RETURN |
| * | SS8 | SET DATA TERMINAL READY |
|   | SS5 | SET REQUEST TO SEND |
|   | WT02 | WAIT 2 SECONDS |
|   | XR05"+++" | |
|   |   | TRANSMIT THE STRING +++ AND WAIT A MAXIMUM OF 05 SECONDS FOR AN ANSWER BACK FROM THE MODEM |
|   | WT02 | WAIT 2 SECONDS |
|   | XR30"AT&F." | |
|   |   | TRANSMIT THE STRING AT&F AND WAIT A MAXIMUM OF 30 SECONDS FOR AN ANSWER BACK FROM THE MODEM. "." IS A CARRIAGE RETURN IN THE STRING. |
|   | WT01 | WAIT ONE SECOND |
|   | XR03"ATVOE0&C1." | |
|   |   | TRANSMIT THE STRING ATVOE0&C1 AND WAIT A MAXIMUM OF 03 SECONDS FOR AN ANSWER BACK FROM THE MODEM. "." IS A CARRIAGE RETURN IN THE STRING. |

```
        WTO1        WAIT ONE SECOND
        XR30"ATVOE0&C1X4D2&WA."
                    TRANSMIT THE STRING ATVOE0&C1X4D2&WA AND WAIT A MAXIMUM
                    OF 30 SECONDS FOR AN ANSWER BACK FROM THE MODEM.  "."
                    IS A CARRIAGE RETURN IN THE STRING.
        CP"10"      COMPARE ANSWER TO 10 "CONNECT 2400"
        BT14        BRANCH 14 BYTES (CHARACTERS) FORWARD IF PREVIOUS TEST
                    WAS TRUE
        CP"5"       COMPARE ANSWER TO 5 "CONNECT 1200"
        BT05        BRANCH 05 BYTES (CHARACTERS) FORWARD IF PREVIOUS TEST
                    WAS TRUE
*       SSE         SET ERROR FLAG
        RT          RETURN
*       TT7         TEST IF DATA SET READY IS TRUE
        BF-08       BRANCH 08 BYTES (CHARACTERS) BACKWARD IF PREVIOUS TEST
                    WAS FALSE
        TT9         TEST IF DATA CARRIER DETECT READY IS TRUE
        BF-08       BRANCH 08 BYTES (CHARACTERS) BACKWARD IF PREVIOUS TEST
                    WAS FALSE
        RT          RETURN GOOD EXIT

PLEXTEL 2222P HAYES COMPATIBLE "AT" COMMAND SET MODEM AUTO DIAL OUT
(189)
        CK120       SET TOTAL ROUTINE TIME TO 120 SECONDS
        SS8         SET DATA TERMINAL READY
        SS5         SET REQUEST TO SEND
        XR30"AT&F."
                    TRANSMIT THE STRING AT&F AND WAIT A MAXIMUM OF 30
                    SECONDS FOR AN ANSWER BACK FROM THE MODEM.  "." IS A
                    CARRIAGE RETURN IN THE STRING.
        WTO1        WAIT ONE SECOND
        CP"O"       COMPARE ANSWER TO O "OKAY"
        BT20        BRANCH 20 BYTES (CHARACTERS) FORWARD IF PREVIOUS TEST
                    WAS TRUE
        XR30"ATVOE0&C1."
                    TRANSMIT THE STRING ATVOE0&C1 AND WAIT A MAXIMUM OF 30
                    SECONDS FOR AN ANSWER BACK FROM THE MODEM.  "." IS A
                    CARRIAGE RETURN IN THE STRING.
        WTO1        WAIT ONE SECOND
*       XR30"ATVOE0&C1."
                    TRANSMIT THE STRING ATVOE0&C1 AND WAIT A MAXIMUM OF 30
                    SECONDS FOR AN ANSWER BACK FROM THE MODEM.  "." IS A
                    CARRIAGE RETURN IN THE STRING.
        WTO1        WAIT ONE SECOND
        CP"O"       COMPARE ANSWER TO O "OKAY"
        BF32        BRANCH 32 BYTES (CHARACTERS) FORWARD IF PREVIOUS TEST
                    WAS FALSE
        XR30"ATVOE0&C1X4&D2&W."
                    TRANSMIT THE STRING ATVOE0&C1X4&D2&W AND WAIT A MAXIMUM
                    OF 30 SECONDS FOR AN ANSWER BACK FROM THE MODEM.  "."
                    IS A CARRIAGE RETURN IN THE STRING.
        CP"O"       COMPARE ANSWER TO O "OKAY"
        BT05        BRANCH 05 BYTES (CHARACTERS) FORWARD IF PREVIOUS TEST
                    WAS TRUE
*       SSE         SET ERROR FLAG
        RT          RETURN
*       TN90        TRANSMIT THE NUMBER FIELD TO THE MODEM AND WAIT A
                    MAXIMUM OF 90 SECONDS FOR AN ANSWER BACK FROM THE MODEM
        CP"23"      COMPARE ANSWER TO 23 "CONNECT 2400 +MNP"
        BT30        BRANCH 30 BYTES (CHARACTERS) FORWARD IF PREVIOUS TEST
                    WAS TRUE
        CP"22"      COMPARE ANSWER TO 22 "CONNECT 1200 +MNP"
        BT20        BRANCH 20 BYTES (CHARACTERS) FORWARD IF PREVIOUS TEST
                    WAS TRUE
```

| | |
|---|---|
| CP"10" | COMPARE ANSWER TO 10 "CONNECT 2400" |
| BT10 | BRANCH 10 BYTES (CHARACTERS) FORWARD IF PREVIOUS TEST WAS TRUE |
| CP"5" | COMPARE ANSWER TO 5 "CONNECT 1200" |
| BF-49 | BRANCH 49 BYTES (CHARACTERS) BACKWARD IF PREVIOUS TEST WAS FALSE |
| WT06 | WAIT 6 SECONDS |
| TT7 | TEST IF DATA SET READY IS TRUE |
| BF-61 | BRANCH 61 BYTES (CHARACTERS) BACKWARD IF PREVIOUS TEST WAS FALSE |
| TT9 | TEST IF DATA CARRIER DETECT READY IS TRUE |
| BF-69 | BRANCH 69 BYTES (CHARACTERS) BACKWARD IF PREVIOUS TEST WAS FALSE |
| HS | DO THE HANDSHAKING BETWEEN THE SMF AND THE REMOTE UNIT. |
| RT | RETURN GOOD EXIT |

Appendix A

V 25 BIS AND PLEXTEL MODEMS ANSWER

| | |
|---|---|
| CK090 | SET TOTAL ROUTINE TIME TO 90 SECONDS |
| TTH | TEST TO FORCE AN HANG UP |
| BF08 | NO |
| RS8 | RESET DATA TERMINAL READY |
| RS5 | RESET REQUEST TO SEND |
| RT | RETURN |
| SB10 | SET UP BAUD RATE |
| SB00 | SET UP CONTROL |
| SS8 | SET DATA TERMINAL READY |
| SS5 | SET REQUEST TO SEND |
| XR05"" | WAIT A MAXIMUM OF 05 SECONDS FOR AN ANSWER BACK FROM THE MODEM |
| CP"INC" | COMPARE ANSWER TO INC |
| BF36 | BRANCH 36 BYTES (CHARACTERS) FORWARD IF PREVIOUS TEST WAS FALSE |
| XR10"" | WAIT A MAXIMUM OF 10 SECONDS FOR AN ANSWER BACK FROM THE MODEM |
| CP"INC" | COMPARE ANSWER TO INC |
| BF19 | BRANCH 19 BYTES (CHARACTERS) FORWARD IF PREVIOUS TEST WAS FALSE |
| XR10"" | WAIT A MAXIMUM OF 10 SECONDS FOR AN ANSWER BACK FROM THE MODEM |
| CP"CNX" | COMPARE ANSWER TO CNX |
| BF02 | BRANCH 02 BYTES (CHARACTERS) FORWARD IF PREVIOUS TEST WAS FALSE |
| RT | RETURN - GOOD |
| SSE | SET ERROR FLAG |
| RS8 | RESET DATA TERMINAL READY |
| RS5 | RESET REQUEST TO SEND |
| RT | RETURN |

V 25 BIS AND PLEXTEL MODEMS DIAL OUT

| | |
|---|---|
| CK120 | SET TOTAL ROUTINE TIME TO 120 SECONDS |
| RSE | RESET ERROR FLAG |
| RS8 | RESET DATA TERMINAL READY |
| RS5 | RESET REQUEST TO SEND |
| SB10 | SET UP BAUD RATE |
| SB00 | SET UP CONTROL |
| SS8 | SET DATA TERMINAL READY |
| TT6 | TEST SIGNAL CLEAR TO SEND |
| BF-08 | BRANCH 08 BYTES (CHARACTERS) BACKWARD IF PREVIOUS TEST WAS FALSE |
| XR01"CRN" | TRANSMIT CRN AND WAIT 1 SECOND FOR AN ANSWER |
| TN01 | TRANSMIT THE NUMBER FIELD TO THE MODEM AND WAIT A MAXIMUM OF 1 SECOND FOR AN ANSWER |

|       | BACK FROM THE MODEM |
|-------|---------------------|
| TT6   | TEST SIGNAL CLEAR TO SEND |
| BT-08 | BRANCH 08 BYTES (CHARACTERS) BACKWARD IF PREVIOUS TEST WAS TRUE |
| TT7   | TEST SIGNAL DATA SET READY |
| BF-08 | BRANCH 08 BYTES (CHARACTERS) BACKWARD IF PREVIOUS TEST WAS FALSE |
| SS5   | SET REQUEST TO SEND |
| TT6   | TEST SIGNAL CLEAR TO SEND |
| BF-08 | BRANCH 08 BYTES (CHARACTERS) BACKWARD IF PREVIOUS TEST WAS FALSE |
| TT7   | TEST SIGNAL DATA SET READY |
| BF-08 | BRANCH 08 BYTES (CHARACTERS) BACKWARD IF PREVIOUS TEST WAS FALSE |
| HS    | DO THE HANDSHAKING BETWEEN THE SMF AND REMOTE UNIT |
| RT    | RETURN GOOD EXIT |

Appendix B

RESTRICTION ON THE SCRIPTS

1. The answer script must contain the routine for hanging up the modem.

It consist of TTH as a test to force a hang up follow by a branch to jump around the routine if TTH is not true.
   Example:

| TTH  | TEST TO FORCE AN HANG UP. |
   |------|---------------------------|
   | BF12 | NO |
   | RS6  | RESET DATA TERMINAL READY |
   | RS5  | RESET REQUEST TO SEND |
   | WT05 | GIVE MODEM ENOUGH TIME TO HANG UP |
   | RT   | RETURN |
   | *    | |

2. Each script has a maximum number of 255 bytes (characters).

3. Remote dial in has priority over auto dial out.

4. Just before each script is executed the following initialization is performed as "defaults":
   1 The error flag is reset.
   2 "Character" Mode is set to 7 bit with even parity
   3 baud rate is set to 2400

The follow is a list of commands for creating a dialogue with a modem. They will be added to or changed as needed.

| D | BFDD | BRANCH FORWARD DD DECIMAL BYTES IF THE PREVIOUS TEST WAS FALSE. THE NEXT BYTE AFTER THIS STRING IS REFERENCE AS BYTE 00. |
|---|------|---|
|   | BF16 | BRANCH 16 BYTES (CHARACTERS) FORWARD IF PREVIOUS TEST WAS FALSE |
| D | BF-DD | BRANCH BACKWARD DD DECIMAL BYTES IF THE PREVIOUS TEST WAS FALSE. THE NEXT BYTE AFTER THIS STRING IS REFERENCE AS BYTE 00. |
|   | BF-09 | BRANCH 09 BYTES (CHARACTERS) BACKWARD IF PREVIOUS TEST WAS FALSE |
| D | BRDD | BRANCH FORWARD DD DECIMAL BYTES. THE NEXT BYTE AFTER THIS STRING IS REFERENCE AS BYTE 00. |
|   | BR16 | BRANCH 16 BYTES (CHARACTERS) FORWARD |

| | | |
|---|---|---|
| D | BR-DD | BRANCH BACKWARD DD DECIMAL BYTES. THE NEXT BYTE AFTER THIS STRING IS REFERENCE AS BYTE 00. |
| | BF-09 | BRANCH 09 BYTES (CHARACTERS) BACKWARD IF PREVIOUS TEST WAS FALSE |
| D | BTDD | BRANCH FORWARD DD BYTES IF THE PREVIOUS TEST WAS TRUE. THE NEXT BYTE AFTER THIS STRING IS REFERENCE AS BYTE 00. |
| D | BT-DD | BRANCH BACKWARD DD BYTES IF THE PREVIOUS TEST WAS TRUE. THE NEXT BYTE AFTER THIS STRING IS REFERENCE AS BYTE 00. |
| D | CKXXX | SET TOTAL ROUTINE TIME TO XXX SECONDS. |
| | CK090 | SET TOTAL ROUTINE TIME TO 90 SECONDS. |
| D | CMLHH | COMPARE LOCATION L WITH HEX VALUE HH |
| C | CP"WWW" | COMPARE THE RECEIVED ANSWER FROM THE TR COMMAND WITH THE VALUE WWW WHICH IS BETWEEN THE ". |
| | CP"10" | COMPARE ANSWER TO 10. |
| D | DCL | DECREMENT LOCATION L'S CONTENTS BY 1 AND TEST IF ZERO. |
| | DCO | DECREMENT LOCATION O'S CONTENTS BY 1 AND TEST IF ZERO. |
| C | HS | HANDSHAKING BETWEEN THE SMF AND THE REMOTE UNIT. NAMELY IT CHECKS THE BAUD RATE AND MODE. SECOND IT HANDSHAKE WITH THE REMOTE UNIT BY SENDING "MRXA" AND CHECKING FOR A RESPONSE OF "RSC2" OR SCAR" BACK. THE SMF WILL WAIT FOR 30 SECONDS FOR A RESPONSE BEFORE GIVING AN ERROR. |
| D | LDLYY | LOAD LOCATION L WITH HEX VALUE OF HH. 0 THROUGH 3 LOCATIONS ONLY. |
| | LDOBA | LOAD LOCATION O WITH HEX VALUE OF BA. |
| | RSX | RESET SIGNAL AS SPECIFIED IN THE NEXT 2 BYTES. |
| C | RSS | RESET REQUEST TO SEND    CA   CT 105 |
| C | RSB | RESET DATA TERMINAL READY   CD   CT 108 |
| D | RSE | RESET ERROR FLAG |
| D | RT | RETURN FROM THIS ROUTINE |
| D | SBXX | INITIALIZE BAUD RATE |

```
                XX = 01 IF 19200 BAUD
                XX = 02 IF  9600 BAUD
                XX = 04 IF  4800 BAUD
                XX = 08 IF  2400 BAUD
                XX = 10 IF  1200 BAUD
                XX = 20 IF   600 BAUD
                XX = 40 IF   300 BAUD

THE DEFAULT IS 2400 BAUD
```

| | | |
|---|---|---|
| D | SCXX | INITIALIZE PARITY AND MODE |

```
              BIT 0      MS BIT RESERVED FOR FUTURE USE
              BIT 1      RESERVED FOR FUTURE USE
              BIT 2      RESERVED FOR FUTURE USE
              BIT 3      RESERVED FOR FUTURE USE
              BIT 4      RESERVED FOR FUTURE USE
              BIT 5      RESERVED FOR FUTURE USE
              BIT 6      0 = 7 BIT MODE
                         1 = 8 BIT MODE
              BIT 7      0 = WITH PARITY
                         1 = WITHOUT PARITY

THE DEFAULT IS 7 BIT MODE WITH PARITY

SSX       SET SIGNAL AS SPECIFIED IN THE NEXT 2 BYTES.

C        SSS       SET REQUEST TO SEND      CA   CT 105
C        SS8       SET DATA TERMINAL READY  CD   CT 108
D        SSE       SET ERROR FLAG

C        TNTT
                   TRANSMIT THE STRING THAT MAKES UP THE TELEPHONE NUMBER
                   AND WAIT A MAXIMUM OF TT SECONDS FOR AN ANSWER BACK FROM
                   THE MODEM.  THE TELEPHONE STRING CAN CONTAIN ANY ASCII
                   CHARACTERS THAT THE MODEM WILL ACCEPT.  YOU MUST CHECK
                   YOUR MODEM MANUAL FOR THIS INFORMATION.
                   THE NUMBER FIELD MUST BE SET UP WITH THE PREAMBLE FOR
                   DIALING OUT.  A CARRIAGE RETURN WILL BE ADDED TO THE END
                   OF THE FIELD WHEN THE NUMBER FIELD IS SENT.

EXAMPLE FOR A HAYES DIALOUT

ATDT123456789

EXAMPLE FOR A V 25 BIS DIALOUT

CRN123456789

TTX       TEST SIGNAL X IS TRUE

C        TT1       TEST IF HIGH SPEED INDICATOR   CI  CT 111
C        TT2       TEST IF RING INDICATOR         CE  CT 125
C        TT6       TEST IF CLEAR TO SEND          CB  CT 106
C        TT7       TEST IF DATA SET READY         CC  CT 107
C        TT9       TEST IF DATA CARRIER DETECT    CF  CT 109
C        TTH       TEST HANG UP FLAG

C        WTXX      WAIT XX SECONDS 00 THROUGH 99 SECONDS

WT05      WAIT 05 SECONDS

C        XRTT"XXXXXXX"
                   TRANSMIT THE STRING XXXXXXX BETWEEN THE " AND WAIT A
                   MAXIMUM OF TT SECONDS FOR AN ANSWER BACK FROM THE
                   MODEM.  THE XXX STRING CAN CONTAIN NON PRINTABLE
                   CHARACTERS, SUCH AS A CARRIAGE RETURN, ETC.  THE SMF
                   WILL ONLY SEND THE CHARACTERS BETWEEN THE QUOTES.  NOTE
                   ANY NON REPEATED CHARACTER CAN BE USE IN PLACE OF THE
                   QUOTE.

XR30"AT&FV0E0&C1&D2&WA."
                   TRANSMIT THE STRING AT&FV0E0&C1&D2&WA. AND WAIT A
                   MAXIMUM OF 30 SECONDS FOR AN ANSWER BACK FROM THE
                   MODEM.  WHERE THE PERIOD REPRESENT A CARRIAGE RETURN
                   WHICH IS NON PRINTABLE.
```

THE RESTRICTIONS AND FORMAT FOR THE ANSWER AND DIAL OUT SCRIPT FILES

THE PATH NAME TO THE ANSWER FILE IS AS FOLLOWS:

^VOLUME IDENTIFIER>DIRECTORY>...>FILE.A

EX: ZVPROG_DIR>V25BIS.A

EX: ZVPROG_DIR>PLEXTEL.A

THE PATH NAME TO THE DIAL OUT FILE IS AS FOLLOWS:

^VOLUME IDENTIFIER>DIRECTORY>...>FILE.D

EX: ZVPROG_DIR>V25BIS.D

EX: ZVPROG_DIR>PLEXTEL.D

THE FORMAT OF THE FILE IS AS FOLLOWS:

THE FILE CONSIST OF ALL ASCII CHARACTERS. THIS WILL ALLOW THE USE OF ANY EDITOR TO GENERATE THESE FILES ON MOD 400.

THE FIRST 4 BYTES OF THE FILE WILL BE THE NUMBER OF BYTES IN THE FILE. THE MAXIMUM SIZE IS 255 BYTES. EX: "0255" IN ASCII DECIMAL. THE REMAINING BYTES WILL BE THE SCRIPT IN ASCII.

EXAMPLE FOR V25 BIS ANSWER SCRIPT:

```
0104
CK090 TTH BF08 RS0 RS5 RT SS00 SB08 SS8 TT6 BF-08 RC05 CP"CNX"
BT21 CP"" BT11 SSE RS8 RS5 RT TT6 BT-08 TT7 BT-08 SS5 TT6 BF-08
HS RT
```

THE PROGRAM THAT LOADS THESE TWO ROUTINES INTO THE SMF SHOULD PROMPT THE USER FOR THE PATH NAME WITHOUT THE ".A OR .D".

EX: ZVPROG_DIR>V25BIS

THE SCRIPT FILES MUST BE FIX RELATIVE FILES.

ATTORNEY DOCKET #510-2389

SUBROUTINE CP
APPENDIX C

```
                COMPARE STRING WITH RETURN DATA
                FIRST CHARACTER = DEMARCATION CHARACTER

SLINK-CP        LDLV (SSCRIPTCW)                          1977C*  21  00 00
  $             SETM (SCR-TRUE)          \SET TRUE        1977F   C8  EE
  $             LDRX (H,BCBSM-H)         \SET MESSAGE POINTER 17981 DD 66 05
  $             LDRX (L,BCBSM-L)                          19784   DD  6E 04
  $             PSBBL                                     19787   E5
  $             JS (SGETLINK)                             19788   CD  C0 9A
  $             POPHL                                     1978B   E1
  $             RTNZ                     \ERROR EXIT      1978C   C0

$             PSBBL                                     1978D   E5
  $             LDHDE (SLK-PST8)                          1978E*  E0  53 08 00
  $             LDHA (SSCBMARKER)        \DEMARCATION CHARACTER 19792* 32 00 00
  $             LDRX (A,BCBMCC)          \MESSAGE COUNT   19795   DD  7E 0E
  $             ORR (A)                                   19798   87
  $             JRNZ (SLINK-CP01)        \NO ZERO         19799   20  14.

$             S (SGETLINK)                              1979B   CD  C0 9A
  $             POPHL                                     1979E   E1
```

| | | | | | |
|---|---|---|---|---|---|
| $ | RTNZ | \ERROR EXIT | 1979F | C0 | |
| $ | LDNDE (SLK-PSTN) | | 197A0* | ED | 53 00 00 |
| $ | LDNLV (SSCRMARKER) | | 197A4* | 21 | 00 00 |
| $ | CPN | | 197A7 | BE | |
| $ | RTZ | \GOOD EXIT | 197A8 | C8 | |
| $ | LDNLV (SSCRIPTCM) | | 197A9* | 21 | 00 00 |
| $ | RESN (SCR-TRUE) | | 197AC | CB | AE |
| $ | RET | | 197AE | C9 | |
| SLINK-CP01 | JS (SGETLINK) | | 197AF | CD | C0 9A |
| $ | POPBL | | 197B2 | E1 | |
| $ | RTNZ | \ERROR EXIT | 197B3 | C0 | |
| $ | LDNDE (SLK-PSTN) | | 197B4* | ED | 53 00 00 |
| SLINK0CP03 | XORN | | 197B8 | AE | |
| $ | INCNL | | 197B9 | 23 | |
| $ | PABNL | | 197BA | E5 | |
| $ | JRZ (SLINK-CP02) | \SAME | 197BB | 28 | 05 |
| $ | LDNLV (SSSCRIPTCM) | | 197BD* | 21 | 00 00 |
| $ | RESN (SCR-TRUE) | \FALSE | 197C0 | CB | AE |
| SLINK-CP02 | JS (SGETLINK) | | 197C2 | CD | C0 9A |
| $ | POPNL | | 197C5 | E1 | |
| $ | RTNZ | \ERROR EXIT | 197C6 | C0 | |
| $ | PSNNL | | 197C7 | E5 | |
| $ | LDNDE (SLK-PSTN) | | 197C8* | ED | 53 00 00 |
| $ | LDNLV (SSCRMARKER) | | 197CC* | 21 | 00 00 |
| $ | CPN | | 197CF | BE | |
| $ | POPNL | | 197D0 | E1 | |
| $ | INCNL | | 197D1 | 23 | |
| $ | RTZ | | 197D2 | C8 | |
| $ | DECNL | | 197D3 | 2B | |
| $ | JR (SLINK-CP03) | | 197D4 | 18 | E2 |

<u>SUBROUTINE RS</u>
<u>APPENDIX C</u>

| | | | | | |
|---|---|---|---|---|---|
| SLINK-RS | LDBCV (SRS-POINT) | \TEST TABLE POINTER | 19832 | 01 | 40 99 |
| $ | JR (SLINK-RS01) | \CONTINUE | 19835 | 18 | 45 |

<u>SUBROUTINE SS</u>
<u>APPENDIX C</u>

| | | | | | |
|---|---|---|---|---|---|
| SLINK-SS | LDBCV (SSS-POINT) | \TEST TABLE POINTER | 19874 | 01 | 6A 99 |
| $ | JR (SLINK-RS01) | \CONTINUE | 19877 | 18 | 03 |

<u>SUBROUTINE TT</u>
<u>APPENDIX C</u>

| | | | | | |
|---|---|---|---|---|---|
| SLINK-TT | LDBCV (BTT-POINT) | \TEST TABLE POINTER | 19879 | 01 | 94 99 |
| SLINK-RS01 | PSHBC | | 1987C | C5 | |
| $ | JS (SGETLINK) | \GET CHARACTER | 1987D | CD | C0 9A |
| $ | LDNDE (SLK-PSTN) | | 19880* | ED | 53 00 00 |
| $ | LDNLV (BTT-TABLE) | | 19884 | 21 | 36 99 |
| $ | LDRR (D,N) | | 19887 | 54 | |
| $ | LDRR (E,L) | | 19888 | 5D | |
| $ | LDRR (B,A) | | 19889 | 47 | |
| $ | ANDV (F0#) | \IS IT A NUMBER | 1988A | E6 | F0 |
| $ | CPV (30#) | | 1988C | FE | 30 |
| $ | JRZ (SLINK-TT01) | \YES | 1988E | 28 | 04 |
| $ | LDRR (A,B) | \NO | 19890 | 78 | |
| $ | ANDV (0F#) | \MAKE UPPER CASE | 19891 | E6 | 0F |
| $ | LDRR (B,A) | | 19893 | 47 | |
| SLINK-TT01 | LDRN (A) | | 19894 | 7E | |
| $ | CPR (B) | | 19895 | B8 | |
| $ | JRZ (SLINK-TT02) | \GOT A MATCH | 19896 | 28 | 0A |
| $ | ORR (A) | | 19898 | B7 | |
| $ | JRNZ (SLINK-TT03) | \NEXT | 19899 | 20 | 04 |
| $ | POPBC | | 1989B | C1 | |
| $ | JP (SLINK-ERR) | \ERROR EXIT NOT IN TABLE | 1989C | C3 | 94 96 |
| SLINK-TT03 | INCNL | | 1989F | 23 | |
| $ | JR (SLINK0TT01) | | 198A0 | 18 | F2 |
| SLINK-TT02 | SBCNL (BE) | | 198A2 | ED | 52 |
| $ | ADCNL (NL) | | 198A4 | ED | 6A |
| $ | POPBC | \TABLE POINTER | 198A6 | C1 | |
| $ | ADCNL (BC) | | 198A7 | ED | 4A |
| $ | LDRN (E) | | 198A9 | 5E | |

SUBROUTINE LT
APPENDIX C

| | | | | |
|---|---|---|---|---|
| $ | INCHL | | 198AA | 23 |
| $ | LDRW (D) | | 198AB | 56 |
| $ | EXDEHL | | 198AC | E8 |
| $ | JPHL | \GO TO ROUTINE | 198AD | E9. |

SUBROUTINE TN
APPENDIX C

| | | | | | |
|---|---|---|---|---|---|
| SLINK TN | LDRV (A,2) | \GET 2 DIGITS OF TIME | 198AE | 3E | 02 |
| $ | JS (SLKDEC2HEX) | | 198B0 | CD | 2A 9A |
| $ | RTNZ | \ERROR EXIT | 198B3 | C0 | |
| $ | JS (SHL2SEC) | \CHANGE FROM SECONDS TO 10 MILLI | 198B4 | CD | D3 9A |
| $ | LDHHL (SSCRTIME) | \SAVE IT | 198B7* | 22 | 00 00 |
| $ | LDHLH (SSCRNUMBER) | | 198BA* | 2A | 00 00 |
| $ | LDDEV (SRMTTKBUF) | \CREATE MESSAGE FOR DIAL OUT | 198BD* | 11 | 00 00 |
| $ | JS (SR:MESST) | \START OF MESSAGE | 198C0* | CD | 00 00 |
| $ | LDHLV (SDIALCR) | \ADD CARRIAGE RETURN) | 198C3 | 21 | 7A 87 |
| $ | JS (SR:MESAD) | | 198C6* | CD | 00 00. |
| $ | LDHLH (SSCRTIME) | \LOAD HL WITH TIMEOUT VALUE | 198C9* | 2A | 00 00 |
| $ | JS (SSENDRECH1) | \SEND MESSSAGE | 198CC | CD | 03 86 |
| $ | RET | | 198CF | C9. | |

APPENDIX D

LINK TABLE

| | | | | |
|---|---|---|---|---|
| (BB,FF) | \BRANCH IF TEST BIT IS FALSE | 1969C | 42 | 46 |
| (BB,RR) | \BRANCH | 1969E | 42 | 52 |
| (BB,TT) | \BRANCH IF TEST BIT IS TRUE | 196A0 | 42 | 54 |
| (CC,EX) | \CLOCK ROUTINE TIMER IN SECONDS | 196A2 | 43 | 48 |
| (CC,HH) | \COMPARE LOCATION WITH VALUE | 196A4 | 43 | 4D |
| (CC,PP) | \COMPARE STRING WITH RETURN DATA | 196A6 | 43 | 50 |
| (DD,CC) | \DECEMENT LOCATION L, TEST IF ZERO | 196A8 | 44 | 43 |
| (HH,SS) | \MODE AND BAUD CHECK AND HANDSHAKE | 196AA | 48 | 53 |
| (LL,HH) | \LOAD LOCATION L WITH HEX VALUE HH | 196AC | 4C | 44 |
| (LL,DD) | | 196AE | 4E | 50 |
| (NN,PP) | \NO OP | 196B0 | 50 | 54 |
| (PP,TT) | \PRINT FOR TRACE | 196B2 | 52 | 53 |
| (RR,SS) | \RESET SIGNAL | 196B4 | 52 | 54 |
| (RR,TT) | \RETURN FROM LINK ROUTINE | 196B6 | 53 | 42 |
| (SS,BB) | \SET BAUD RATE | 196B8 | 53 | 43 |
| (SS,CC) | \SET CONTROL FOR REMOTE | 196BA | 53 | 53 |
| (SS,SS) | \SET SIGNAL | 196BC | 54 | 4E |
| (TT,NN) | \TRANSMIT NUMBER AND WAIT FOR ANSWER | 196BE | 54 | 54 |
| (TT,TT) | \TEST THE SIGNAL | 196C0 | 57 | 54 |
| (WW,TT) | \WAIT | 196C2 | 58 | 52 |
| (XX,RR) | \TRANSMIT AND WAIT FOR ANSWER | 196C4 | 00 | 00. |
| (0) | | | | |
| (SLINK-BF) | \BRANCH IF TEST BIT IS FALSE | 196C6 | F0 | 96 |
| (SLINK-BR) | \BRANCH | 196C8 | 07 | 97 |
| (SLINK-BT) | \BRANCH IF TEST BIT IS TRUE | 196CA | 3C | 97 |
| (SLINK-CE) | \CLOCK ROUTINE TIMER IN SECONDS | 196CC | 47 | 97 |
| (SLINK-CH) | \COMPARE LOCATION WITH VALUE | 196CE | 66 | 97 |
| (SLINK-CP) | \COMPARE STRING WITH RETURN DATA | 196D0 | 7C | 97 |
| (SLINK-DC) | \DECEMENT LOCATION L, TEST IF ZERO | 196D2 | 86 | 97 |
| (SLINK-HS) | \MODE AND BAUD CHECK AND HANDSHAKE | 196D4 | E7 | 97 |
| (SLINK-LD) | \LOAD LOCATION L WITH HEX VALUE HH | 196D6 | 16 | 98 |
| (SNOP-CODE) | \NOT OPERATION | 196D8 | 38 | 98 |

APPENDIX D

| | | | | |
|---|---|---|---|---|
| (SLINK-PT) | \PRINT FOR TRACE | 196DA | 22 | 98 |
| (SLINK-RS) | \RESET SIGNAL | 196DC | 32 | 98 |
| (SLINK-RT) | \RETURN FROM LINK ROUTINE | 196DE | 37 | 98 |
| (SLINK-SB) | \SET BAUD RATE | 196E0 | 3F | 98 |
| (SLINK-SC) | \SET CONTROL FOR REMOTE | 196E2 | 44 | 98 |
| (SLINK-SS) | \SET SIGNAL | 196E4 | 74 | 98 |
| (SLINK-TN) | \TRANSMIT NUMBER AND WAIT FOR ANSWER | 196E6 | AE | 98 |
| (SLINK-TT) | \TEST THE SIGNAL | 196E8 | 79 | 98 |
| (SLINK-WT) | \WAIT | 196EA | B0 | 98 |
| (SLINK-XR) | \TRANSMIT AND WAIT FOR ANSWER | 196EC | E0 | 98 |
| (0) | | 196EE | 00 | 00. |

What is claimed is:

1. In a data processing system having a communication manager memory for storing communications manager programs for controlling communications between the data processing system and remote devices external to the data processing system, a processor connected to the communications manager memory and responsive to the communications manager programs for performing communications operations, at least one communications link connected to the remote devices, at least one modem connected to the communications links for performing communications operations with the remote devices through the communications links, a communications request means connected from the data processing system and the modem and to the processor and responsive to communications operations of the data processing system, including communications operations of the modem, for generating requests for communication by the data processing system with a remote device, and at least one controller connected to the modems for controlling the communications operations of the modems, a modem adaptor for adapting the controller to a plurality of types of modems, comprising:

a script memory connected from the processor for storing scripts for directing operations of a modem, each script being comprised of a sequence of links and each link directing a corresponding operation related to control of a modem, and a modem subroutine memory connected to the controller for storing a library of modem control subroutines, each subroutine corresponding to a link and controlling an operation related to operation of a modem, and a link table memory connected from the processor and to the modem subroutine memory for storing a link table relating each link to the corresponding subroutine, wherein the processor is responsive to a request for communication with a remote device for selecting and executing a corresponding communication manager program for the requested operation, the communication manager program including a script for controlling the modem associated with the remote device for the requested operation, the processor being responsive to the links of the selected script for reading the relationship between each link of the selected script and the corresponding modem control subroutine stored in the modem subroutine memory from the link table and selecting and reading the modem control subroutines corresponding to the links from the modem subroutine memory, and the controller being connected from the modem subroutine memory for receiving the modem control subroutines from the modem subroutine memory and responsive to the modem control subroutines corresponding to the links and read from the modem subroutine memory by the processor for controlling the modem to perform the requested operation.

2. The modem adaptor of claim 1, wherein the scripts for each type of modem include a call script for establishing communication between the data processing system and a remote device wherein the communication is initiated by the data processing system.

3. The modem adaptor of claim 1, wherein the scripts for each type of modem include an answer script for establishing communication between the data processing system and a remote device wherein the communication is initiated by the remote device.

4. The modem adaptor of claim 1, wherein the scripts for each type of modem include a hang-up script for terminating the connection between the modem and the remote device when the communication is concluded.

5. The modem adaptor of claim 1, wherein the links are selected from a set of links and include simple links, each simple link containing a command field stating an operation to be performed.

6. The modem adaptor of claim 1, wherein the links are selected from a set of links and include variable links, each variable link containing a command field and a variable field, the command field indicating the operation to be executed and the variable field containing a variable to be used in the execution.

7. The modem adaptor of claim 1, wherein the links are selected from a set of links and include value links, each value link containing a command field and a value field wherein the command field indicates the operation to be performed and the value field contains a set of alphanumeric characters which are to be sent to the modem.

8. The modem adaptor of claim 1, wherein the links are selected from a set of links and include transmit links, each transmit link containing a command field, a value field, and a variable field wherein the command field indicates that a transmit operation is to be performed, the value field contains a string of alphanumeric characters to be transmitted to the modem, and the variable field define a maximum time period in which to receive a response from the mode.

9. In a data processing system having a communication manager memory for storing communications manager programs for controlling communications between the data processing system and remote devices external to the data processing system, a processor connected to the communications manager memory and responsive to the communications manager programs for performing communications operations, at least one communications link connected to the remote devices, at least one modem connected to the communications links for performing communications operations with the remote devices through the communications links, a communications request means connected from the data processing system and the modem and to the processor and responsive to communications operations of the data processing system, including communications operations of the modem, for generating requests for communication by the data processing system with a remote device, and at least one controller connected to the modems for controlling the communications operations of the modems, a method for adapting the controller to a plurality of types of modems, comprising the steps of:

storing scripts for directing operations of a modem in a script memory connected from the processor, wherein each script is comprised of a sequence of links and each link directs a corresponding operation related to control of a modem, storing a library of modem control subroutines in a modem subroutine memory connected to the controller, each subroutine corresponding to a link and controlling an operation related to operation of a modem, and storing a link table relating each link to the corresponding subroutine in a link table memory connected from the processor, wherein by operation of the processor and responsive to a request for communication with a remote device, selecting and executing a corresponding communication manager program for the requested operation, the communication manager program including a script for controlling the modem associated with the remote device for the requested operation, and responsive to the links of the selected script, reading the relationship between each link of the selected script and the corresponding modem control subroutine stored in the modem subroutine memory from the link table, and selecting and reading the modem control subroutines corresponding to the links from the modem subroutine memory, and by operation of the controller, the controller being connected from the modem subroutine memory for receiving the modem control subroutines from the modem subroutine memory and responsive to the modem control subroutines corresponding to the links and read from the modem subroutine memory by the processor, controlling the modem to perform the requested operation.

10. The method of claim 9, wherein the scripts for each type of modem include a call script for establishing communication between the data processing system and a remote device wherein the communication is initiated by the data processing system.

11. The method of claim 9, wherein the scripts for each type of modem include an answer script for establishing communication between the data processing system and a remote device wherein the communication is initiated by the remote device.

12. The method of claim 9 wherein the scripts for each type of modem include a hang-up script for terminating the communication between the modem and the remote device when the communication is concluded.

13. The method of claim 9, wherein the links are selected from a set of links and include simple links, each simple link containing a command field stating an operation to be performed.

14. The method of claim 9, wherein the links are selected from a set of links and include variable links, each variable link containing a command field and a variable field, the command field indicating the operation to be executed and the variable field containing a variable to be used in the execution of the operation.

15. The method of claim 9, wherein the links are selected from a set of links and include value links, each value link containing a command field and a value field wherein the command field indicates the operation to be performed and the value field contains a set of alphanumeric characters which are to be sent to the modem.

16. The method of claim 9, wherein the links are selected from a set of links and include transmit links, each transmit link containing a command field, a value field, and a variable field wherein the command field indicates that a transmit operation is to be performed, the value field contains a string of alphanumeric characters to be transmitted to the modem, and the value field defines a maximum time period in which to receive a response from the mode.

* * * * *